US009495538B2

(12) United States Patent
Schneider et al.

(10) Patent No.: US 9,495,538 B2
(45) Date of Patent: Nov. 15, 2016

(54) GRADUATED ENFORCEMENT OF RESTRICTIONS ACCORDING TO AN APPLICATION'S REPUTATION

(75) Inventors: Kenneth Schneider, San Francisco, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 511 days.

(21) Appl. No.: 12/238,300

(22) Filed: Sep. 25, 2008

(65) Prior Publication Data

US 2010/0077445 A1    Mar. 25, 2010

(51) Int. Cl.
*G06F 17/00* (2006.01)
*G06F 21/52* (2013.01)

(52) U.S. Cl.
CPC ....... *G06F 21/52* (2013.01); *G06F 2221/2113* (2013.01); *G06F 2221/2115* (2013.01)

(58) Field of Classification Search
CPC .. G06F 21/6218; G06F 21/10; G06F 21/602; G06F 21/52; G06F 2221/2115; G06F 2221/2113; G06F 21/121; G06F 21/125; G06F 21/00
USPC .......................................... 726/2, 3, 22–25
See application file for complete search history.

(56) References Cited

U.S. PATENT DOCUMENTS

| | | | |
|---|---|---|---|
| 7,284,124 B1 | 10/2007 | Ginsberg | |
| 7,490,356 B2 | 2/2009 | Lieblich et al. | |
| 7,571,482 B2 | 8/2009 | Polyakov et al. | |
| 7,617,519 B2 | 11/2009 | Williams | |
| 7,647,634 B2 | 1/2010 | Mayfield et al. | |
| 7,707,632 B2 | 4/2010 | Nath et al. | |
| 7,761,912 B2 | 7/2010 | Yee et al. | |
| 7,788,700 B1 * | 8/2010 | Feezel et al. | 726/2 |
| 7,831,522 B1 | 11/2010 | Satish et al. | |
| 7,870,609 B2 | 1/2011 | Hulten et al. | |
| 7,917,481 B1 | 3/2011 | Kale et al. | |
| 8,087,082 B2 | 12/2011 | Bloch et al. | |
| 8,095,112 B2 * | 1/2012 | Chow et al. | 455/410 |
| 8,145,562 B2 | 3/2012 | Wasserblat et al. | |

(Continued)

FOREIGN PATENT DOCUMENTS

| | | |
|---|---|---|
| JP | 2007220007 A | 8/2007 |
| WO | WO 2006/134691 A1 | 12/2006 |

OTHER PUBLICATIONS

Introductory Real Analysis, Silverman, Richard, 1970.*

(Continued)

*Primary Examiner* — Luu Pham
*Assistant Examiner* — Jahangir Kabir
(74) *Attorney, Agent, or Firm* — Fenwick & West LLP

(57) ABSTRACT

Security software on a client observes a request for a resource from an application on the client and then determines the application's reputation. The application's reputation may be measured by a reputation score obtained from a remote reputation server. The security software determines an access policy from a graduated set of possible access policies for the application based on the application's reputation. The security software applies the access policy to the application's request for the resource. In this way, the reputation-based system uses a graduated trust scale and a policy enforcement mechanism that restricts or grants application functionality for resource interactivity along a graduated scale.

25 Claims, 4 Drawing Sheets

(56) References Cited

U.S. PATENT DOCUMENTS

| | | | |
|---|---|---|---|
| 8,225,406 | B1 | 7/2012 | Nachenberg |
| 8,250,657 | B1 | 8/2012 | Nachenberg et al. |
| 8,296,244 | B1 | 10/2012 | Heroux |
| 8,359,632 | B2 | 1/2013 | Guo et al. |
| 9,111,089 | B1* | 8/2015 | Bhatia ............... G06F 21/00 |
| 2002/0046041 | A1 | 4/2002 | Lang |
| 2002/0099586 | A1 | 7/2002 | Bladen et al. |
| 2002/0116635 | A1* | 8/2002 | Sheymov ............ G06F 9/445 726/24 |
| 2004/0019807 | A1 | 1/2004 | Freund |
| 2004/0123117 | A1* | 6/2004 | Berger ............ H04L 63/1408 713/188 |
| 2005/0204162 | A1 | 9/2005 | Rayes et al. |
| 2005/0232423 | A1* | 10/2005 | Horvitz et al. ............... 380/255 |
| 2006/0253458 | A1 | 11/2006 | Dixon et al. |
| 2006/0253583 | A1 | 11/2006 | Dixon et al. |
| 2007/0033636 | A1 | 2/2007 | Buckley et al. |
| 2007/0064617 | A1 | 3/2007 | Reves |
| 2007/0067844 | A1 | 3/2007 | Williamson et al. |
| 2007/0094260 | A1 | 4/2007 | Murphy et al. |
| 2007/0168311 | A1* | 7/2007 | Genty et al. ............... 706/60 |
| 2007/0208613 | A1 | 9/2007 | Backer |
| 2007/0261116 | A1 | 11/2007 | Prafullchandra et al. |
| 2008/0022384 | A1 | 1/2008 | Yee et al. |
| 2008/0052758 | A1 | 2/2008 | Byrnes |
| 2008/0072049 | A1 | 3/2008 | Cross et al. |
| 2008/0092235 | A1 | 4/2008 | Comlekoglu |
| 2008/0115213 | A1 | 5/2008 | Bhatt et al. |
| 2008/0120699 | A1 | 5/2008 | Spear |
| 2008/0133531 | A1 | 6/2008 | Baskerville et al. |
| 2008/0141366 | A1 | 6/2008 | Cross et al. |
| 2008/0189788 | A1 | 8/2008 | Bahl |
| 2008/0229422 | A1 | 9/2008 | Hudis et al. |
| 2008/0255928 | A1 | 10/2008 | Tomeny |
| 2008/0288330 | A1 | 11/2008 | Hildebrand et al. |
| 2009/0024425 | A1* | 1/2009 | Calvert ............................ 705/7 |
| 2009/0044024 | A1 | 2/2009 | Oberheide et al. |
| 2009/0119541 | A1 | 5/2009 | Inoue et al. |
| 2009/0165131 | A1 | 6/2009 | Treadwell |
| 2009/0172815 | A1 | 7/2009 | Gu et al. |
| 2009/0240769 | A1 | 9/2009 | Schran |
| 2009/0282476 | A1 | 11/2009 | Nachenberg et al. |
| 2009/0287819 | A1 | 11/2009 | Iverson |
| 2009/0300712 | A1 | 12/2009 | Kaufmann et al. |
| 2009/0328209 | A1 | 12/2009 | Nachenberg |
| 2009/0328224 | A1 | 12/2009 | Hernacki et al. |
| 2010/0031361 | A1 | 2/2010 | Shukla |
| 2010/0125911 | A1 | 5/2010 | Bhaskaran |
| 2010/0145953 | A1 | 6/2010 | Charles et al. |
| 2015/0088733 | A1* | 3/2015 | Monastyrsky ....... G06Q 20/382 705/39 |
| 2016/0112451 | A1* | 4/2016 | Jevans ............... H04L 63/1408 726/25 |

OTHER PUBLICATIONS

DGMonitor: a performance monitoring tool for sandbox-based desktop grid platforms, Cicotti et al, IEEE 2004.*

On certifying mobile code for secure applications, Ghosh et al, IEEE 1998.*

"GreenBorder", Wikipedia, 1 page, [online] [Retrieved on Dec. 31, 2008] Retrieved from the Internet <URL: http://en.wikipedia.org/w/index.php?title=GreenBorder&printable=yes>.

Rubenking, N., "Nonsignature Antimalware", PCMag.com, Oct. 30, 2006, 6 pages, [online] [Retrieved on Dec. 31, 2008] Retrieved from the Internet <URL:http://www.pcmag.com/print_article2/0,1217,a%253D181852,00.asp>.

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

Ioffe, J., "To Catch a Cyberthief: How Symantec Does It," Fortune Brainstorm Tech, Sep. 14, 2009, 3 pages [Online] [Retrieved on Mar. 30, 2010] Retrieved from the Internet<URL:http://brainstormtech.blogs.fortune.cnn.com/2009/09/14/to-catch-a-cyberthief-how-symantec-does-it/ >.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

European Extended Search Report, European Application No. 09169538.7, Oct. 25, 2010, 5 pages.

European Examination Report, European Application No. 09169538.7, Jan. 16, 2012, 4 pages.

Japanese Office Action, Japanese Application No. 2009-217767, Jan. 7, 2014, 5 pages.

Japanese Office Action, Japanese Application No. 2009-217767, Aug. 26, 2014, 2 pages (with concise explanation of relevance).

European Summons to Attend Oral Proceedings Pursuant to Rule 115(1) EPC, European Application No. 09169538.7, Feb. 5, 2015, 6 pages.

\* cited by examiner

GRADUATED ENFORCEMENT OF RESTRICTIONS ACCORDING TO AN APPLICATION'S REPUTATION

BACKGROUND

This invention relates generally to computer security software, and more particularly to enforcing restrictions on an application based on the application's reputation.

There is a wide variety of malicious software (malware) that can attack modern computers. Malware threats include computer viruses, worms, Trojan horse programs, spyware, adware, crimeware, and phishing websites. Modem malware is often designed to provide financial gain to the attacker. For example, malware can surreptitiously capture important information, such as logins, passwords, bank account identifiers, and credit card numbers. Similarly, malware can provide hidden interfaces that allow an attacker to access and control the compromised computer.

While classical malware was usually mass-distributed to many computers, modern malware is often targeted and delivered to only a relative handful of computers. For example, a Trojan horse program can be designed to target computers in a particular department of a particular enterprise. Likewise, a false email can include a phishing attack that is directed to only customers of a certain bank or other electronic commerce site. Mass-distributed malware can often be detected and disabled by conventional security software, which uses techniques such as signature scanning and behavior monitoring heuristics to detect the malware. However, these techniques are less effective for detecting targeted threats, since there are fewer instances of the same malware and the security software might not be configured to recognize it.

Moreover, even mass-distributed malware is becoming harder to detect. A malicious website might automatically generate new malicious code for every few visitors. As a result, the malware is widely-distributed, but only a small number of users have the exact same code; hence, it becomes impractical to generate signatures and use signature scanning-based techniques to detect the malware. Sometimes, the different versions of the malware perform different functions, which also makes the malware difficult to detect through heuristics and other techniques.

Further, security companies that analyze malware to develop signatures, heuristics, and other techniques for detecting it receive a large number of malware submissions. The security companies sometimes have no way to effectively measure the threat posed by submitted malware. For example, the security companies might not know whether submitted software is truly malicious or how widely a particular piece of malware is distributed. As a consequence, the security companies have a difficult time ranking or triaging the malware submissions to focus on analyzing the submissions that constitute the greatest threats.

These problems have affected reputation-based systems that use black listing to block suspected malware or white listing to allow only approved clean software. Black listing methods are collapsing under the sheer volume of fingerprints that are now needed to identify actively mutating and proliferating malware. Similarly, white list policies, which only allow known good software to run, are too incomplete and therefore too restrictive for consumer environments— and even most enterprise environments. Maintenance and timely distribution of pure white list databases of known good applications cannot keep pace with the distribution of legitimate software, resulting in too much legitimate software being blocked because the white list database is out of date. Accordingly, both black listing and white listing solutions suffer due to the high rate at which new malware and legitimate software are developed, as these systems may not properly deal with new, unknown code.

Some previous systems have used virtual sandboxing, similar to application virtualization, to allow unknown sites to operate on virtual copies of system resources. Other systems have used application resourcing to create duplicate copies of sensitive resources when modified by unknown applications. But these solutions are simply binary; the application is either provided access to real resources or to a copy based on whether the application is known or unknown to the system. Therefore, there is a need in the art for new ways to protect a client from malware while allowing legitimate software to operate and use the client's resources.

SUMMARY

In contrast to previous solutions, embodiments of the invention provide an application with graduated access to a client's resources according to a degree of trust given to the application according to a reputation scale. Such a non-binary mapping between an application's level of trust and its level of access to a client's resources may be automatically and transparently applied when the application attempts to access resources of the client. In one embodiment, the reputation-based system uses a graduated trust scale and a policy enforcement mechanism that restricts or grants application functionality for resource interactivity along a graduated scale from no access to full access. This allows for a reasonable compromise between previous black listing and white listing approaches, where unknown applications would either be given full access (as in the case of black listing) or be completely prohibited from access (as in the case of white listing).

In one embodiment of the invention, upon observing a request for a resource from an application on a client, security software on the client determines a measure of a reputation for the application. The application's reputation may be measured by a reputation score, which may be obtained from a remote reputation server. The security software then selects an access policy for the application based on the application's reputation, where the access policy is not merely binary based on whether the application is known or unknown. For example, the access policy may be selected from a set of three or more access policies, or the security policy may simply provide a level of access for the application that is between allowing full access to disallowing access to the requested resource. Once this access policy is determined, the security software applies the limitations of the access policy to the request for the resource, for example, to allow or disallow access, or to allow a limited access.

Embodiments of the invention are not limited to applying restrictions on applications, and instead may apply restrictions on any entity that might attempt to access a client's resources. For example, these entities may include websites, other computing systems coupled to the client via a network, peripheral devices, and any other hardware or software entity that may attempt to gain access to a client's resources.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
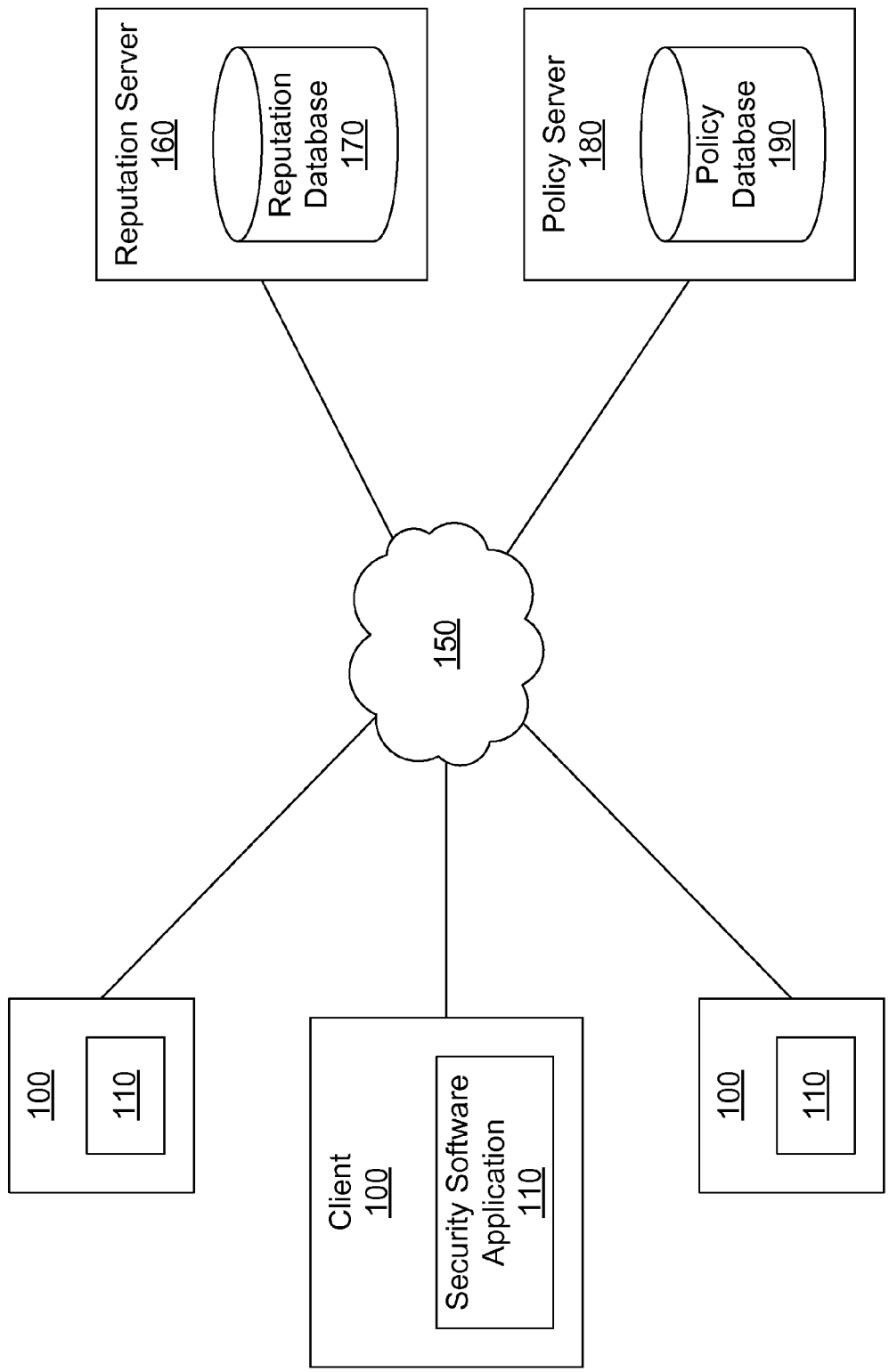
FIG. 1 is a high-level block diagram of a computing environment, in accordance with an embodiment of the invention.

FIG. 1 illustrates a network diagram including a user-assisted security system for detecting and blocking malicious software on a client 100. In one embodiment, the client 100 is a computer used by one or more users to perform activities including downloading, installing, and/or executing files and browsing web sites on the network 150. The client 100, for example, can be a personal computer executing a web browser that allows the user to retrieve and display content from web servers and other computers over the network 150. In other embodiments, the client 100 is a network-capable device other than a computer, such as a personal digital assistant (PDA), a mobile telephone, a pager, a television "set-top box," or any other suitable computing device. For purposes of this description, the term "client" also includes computers such as servers and gateways that encounter files or other entities that might constitute malicious code or other threats. For example, the client 100 may be a network gateway located between an enterprise network and the Internet. The client 100 can also be a mail server or web server that stores files that can be accessed by other clients.

The security system may further comprise a reputation server 160 and a policy server 180. The reputation server 160 includes or is otherwise coupled to a reputation database 170. The reputation database 170 maintains reputation scores for applications and/or other entities for which a measure of reputation is tracked. The reputation server 160 is provides access to the reputation scores in the reputation database 170. The policy server 180 includes or is otherwise coupled to a policy database 190. The policy database 190 maintains a set of policies for applications and/or other entities that are supported by embodiments of the invention. The policy server 180 provides access to the policies in the policy database 190. The operation and functionalities of the reputation server 160 and the policy server 180 are described in more detail below.

A network 150 represents the communication pathways between the clients 100, the reputation server 160, and the policy server 180. In one embodiment, the network 150 is the Internet. The network 150 can also use dedicated or private communications links that are not necessarily part of the Internet. In one embodiment, the network 150 uses standard communications technologies and/or protocols. Thus, the network 150 can include links using technologies such as Ethernet, 802.11, integrated services digital network (ISDN), digital subscriber line (DSL), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 150 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
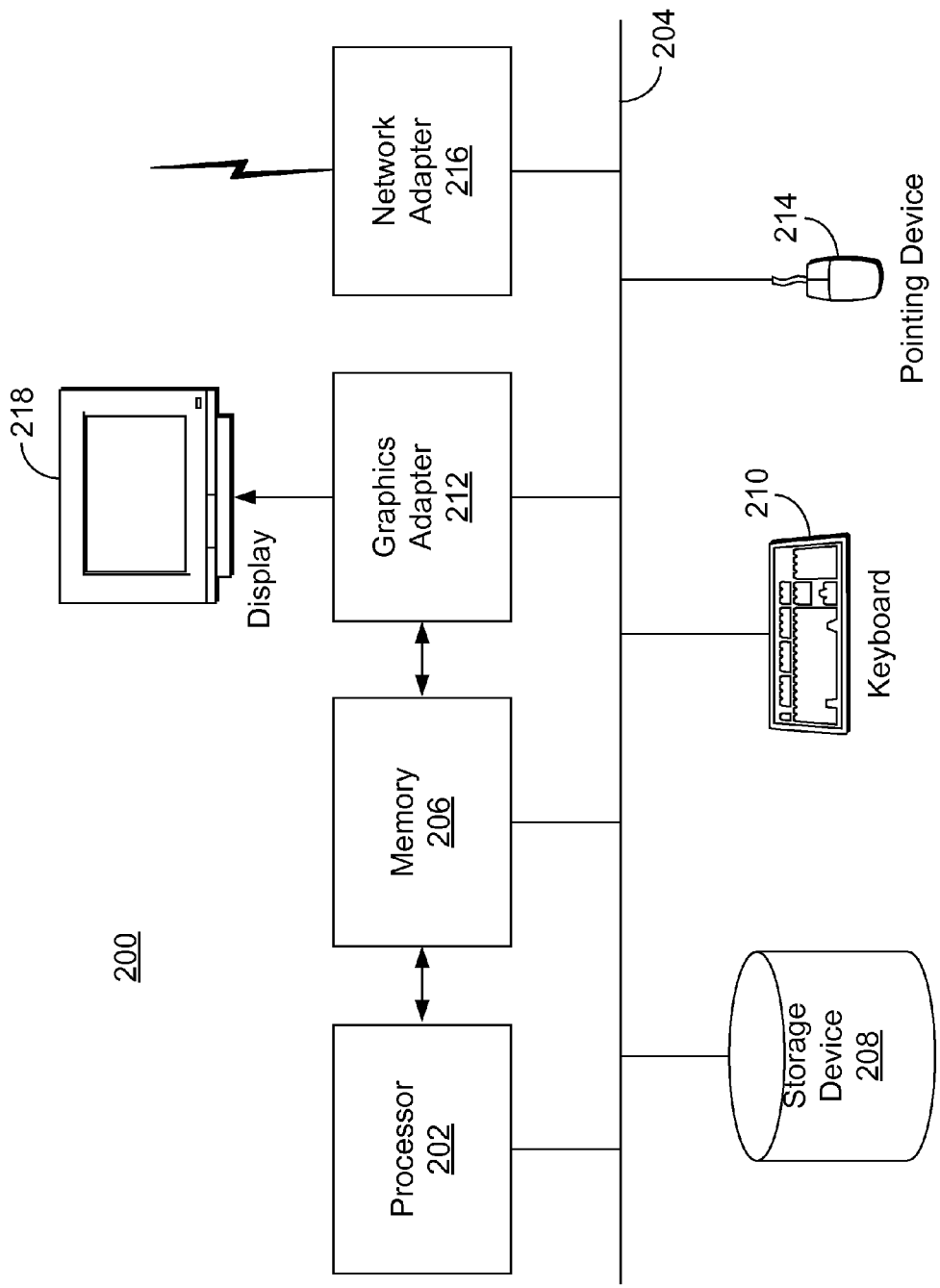
FIG. 2 is a high-level block diagram illustrating a typical computer for use as a reputation server or client, in accordance with an embodiment of the invention.

FIG. 2 is a high-level block diagram illustrating a typical computer 200, which may be used as a client 100, the reputation server 160, and/or the policy server 1 80. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 150.

As is known in the art, the computer 200 is adapted to execute computer program modules. As used herein, the term "module" refers to computer program logic and/or data for providing the specified functionality, stored on a computer-readable storage medium and accessible by the processing elements of the computer 200. A module may be implemented in hardware, firmware, and/or software. In one embodiment, the modules are stored on the storage device 208, loaded into the memory 206, and executed by the processor 202.

The types of computer systems 200 used by the entities of FIG. 1 can vary depending on the embodiment and the processing power used by the entity. For example, a client 100 that is a mobile telephone typically has limited processing power, a small display 218, and might lack a pointing device 214. The reputation server 160 or the policy server 180, in contrast, may comprise multiple blade servers working together to provide the functionalities described herein.

In one embodiment, the client 100 executes a security software application 110 that monitors the client 100. In an embodiment, the security software application 110 monitors processes running on the client 100, where the processes may comprise malicious code. For example, the security software application 110 may monitor actions on the client 100 such as the calling of graphics functions to display items on a display of the client 100. In addition to the security software application 110, the client 100 may also store and execute one or more other source applications on the client 100. The source applications may comprise any type of executable file, library (such as a DLL), document including a markup language, or any other file on the client 100 that includes executable code or other instructions.

The client 100 communicates over a network 150 with a reputation server 160. The reputation server 160 may also communicate with a number of other client computing systems over the network 150, for example, to maintain an online community of users for tracking the reputation of various applications and other software entities with which client computing systems may interact. U.S. application Ser. No. 11/618,215, filed Dec. 29, 2006, incorporated by reference in its entirety, describes methods and systems for computing a reputation score for an entity using client hygiene scores for various client computing systems, where the hygiene scores represent assessments of the trustworthiness of the clients. In this context, a client's trustworthiness may refer to the client's propensity for getting infected by malicious code and other computer related threats, and/or the ability of the user to avoid the threats. Alternatively, reputation scores for applications may be computed according to any other desired method, which may or may not be based on hygiene scores of a set of clients that use the applications.

Using reputation scores based on a community of other users associates the users' abilities to avoid threats with their decisions to engage in certain activities involving computer-related entities they encounter. This approach leverages the collective intelligence of the users to assign reputation scores to files, websites, and other entities that accurately measures the risks associated with the entities. The reputation scores may be computed without requiring the users to evaluate or judge an entity explicitly. Further, the reputation scores may be computed without requiring a sophisticated analysis of the files, websites, or other potentially-malicious entities. Therefore, the approach is well-suited to a computing environment where there are significant amounts of malware or other threats that might not be identified using conventional signature scanning and/or heuristic techniques.

Figure 3:
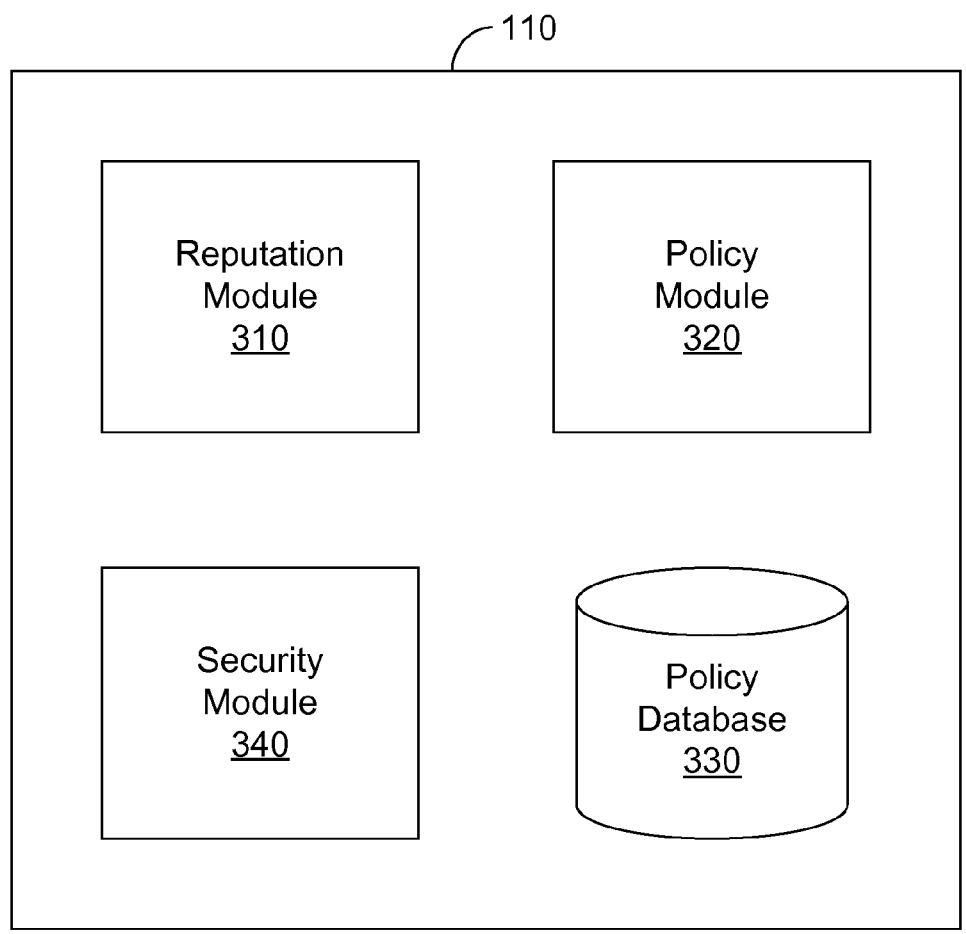
FIG. 3 is a diagram of a security software application, in accordance with an embodiment of the invention.

FIG. 3 illustrates an embodiment of the security software application 110, stored on and executed by a client 100. The security software application 110 comprises a reputation module 310, a policy module 320, a policy database 330, and a security module 340. As described in the following, embodiments of the security software application 110 provide graduated enforcement of application restrictions on a client according to the corresponding reputations of the applications on the client. The enforced restrictions may completely allow or disallow access to the client's resources, or may provide some limited amount of access between full access and no access.

Figure 4:
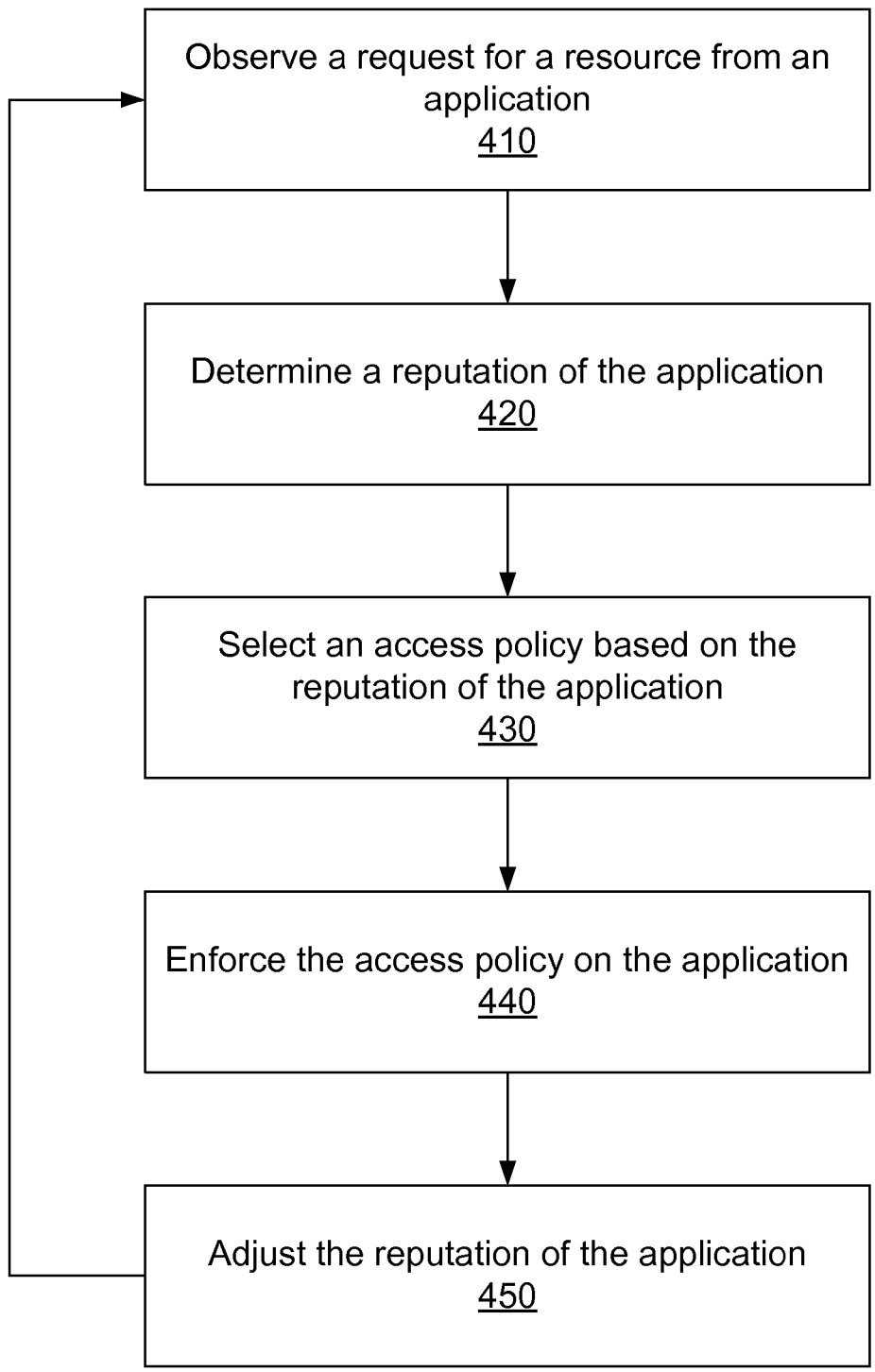
FIG. 4 is a flow diagram of a method for enforcing application restrictions, in accordance with an embodiment of the invention.

FIG. 4 illustrates a process for providing graduated enforcement of application restrictions on a client according to the corresponding reputations of the applications on the client. The operations described in FIG. 4 may be performed by the security software application 110 on the client 100; however, the actions need not be performed all by one entity or software module. Any combination of software modules may be used to implement the functionalities of the security software application 110, some of which may be executed by a system other than the client 100 in communication with the client 100.

In one embodiment, the security software application 110 observes 410 a request for a resource from another application running on the client. For example, the security software application 110 may monitor certain types of or all of the processes that are currently running on the client 100. These processes may include, for example, calling of graphics functions to display items on the client's display, reading from or writing to particular areas of the client's memory, or using a particular port for communication outside the client via a network. These are merely examples of processes in which an application may request a resource of the client 100, as many more variations and possibilities exist. The particular resources of the client 100 that may be requested also vary widely, such as the client's memory, display capabilities, and network interfaces, to name a few. In one embodiment, the security software application 110 is configured to monitor requests for only a particular set of client resources that is determined to be suspicious (such as certain portions of the memory or certain communication ports).

Once the security software application 110 has observed 410 a request for a client resource from a particular application, the reputation module 310 determines 420 the application's reputation. In one embodiment, the application's reputation is represented by a reputation score, which may comprise a numerical value within a predefined scale from low reputation to high reputation (or trustworthiness). The reputation score for a particular application is a measure of the application's trustworthiness, as determined by the reputation-based system. In one embodiment, the reputation module 310 obtains the application's reputation score from the reputation server 160, which maintains reputation scores for a plurality of applications as described above.

The reputation module 310 then passes the application's reputation score to the policy module 320. The policy module 320 then uses this reputation score to select 430 an access policy to be applied to the application's request for a resource. The policy module 320 may obtain the selected access policy from a policy database 330, which is on the client 100 or communicatively coupled to the client 100. If the policy module obtains the access policy directly from the policy database 330, the policy module 320 may consult a reference that defines a mapping between a set of possible reputation scores and a corresponding set of possible access policies for the application. This mapping may be implemented by, for example, a table of reputation scores and corresponding access policies, wherein the policy module 320 simply selects 430 the access policy that corresponds to the application's reputation score. Alternatively, the mapping between a reputation and an access policy may comprise any other suitable mechanism, including a function that provides for a continuous scale of access policies based given a reputation score as an input to the function.

In another embodiment, the policy module 320 selects the access policy by forwarding the reputation score to the policy server 180 via network 150. The policy server 180 then maps the reputation score to the appropriate access policy (e.g., as described above) to determine the access policy to apply to the application's resource request. The policy server 180 may obtain this access policy from the policy database 190. The policy server 180 then sends the selected access policy to the policy module 320.

As a general rule, an application will be given more access to the client's resources, on a graduated scale rather than a binary one. Therefore, as an application has a higher reputation, it will tend to be permitted a relatively higher level of access to the client's resources. However, the mapping between reputation and access may be different for different applications, or for requests for different resources, effectively imposing different reputation requirements depending on the application making the request and/or the resource being requested. For example, a first application made by a well-known software provider may be given more access to the client's resources than a second application made by an unknown software provider, even though the second application's reputation score is higher than the first application's. This allows for more flexibility in setting the graduated application restrictions.

The set of possible access policies for a particular application may provide graduated restrictions in a number of different ways. The mapping between access policy and the reputation may be highly configurable, and many different types of mappings are possible. In one simple example, well-known good applications have no restrictions, well-known bad applications are not allowed access to any resources, and unknown applications are allowed to run only in a tight sandbox with virtual copies of sensitive resources. This simple policy may be enhanced with gradual loosening of the sandbox restrictions based on the reputation of the software, such that several gradations of partial access exist depending on the application's reputation.

The restrictions defined by a set of access policies may also be specific to a particular client resource. For example, the access policies may restrict the output ports that an application may use. A highly trusted application may be able to use any output port, whereas an application with an intermediate reputation level may be allowed to use only certain ports, and another application with a very low level of trust may not be able to use any output ports (and thus may not send messages outside the client). In another example, the access policy defines portions of the system memory and the ability to read, write, or do both to those portions. The more trusted an application is, the more portions of memory it can access and the more likely it will be able to read and write to those portions. In yet another example, the access policy may provide access to a particular resource for a given amount of time, where the time is a function of the reputation score. Applications with higher reputation scores will then not need to request a lease to the resource as frequently as applications having lower reputation scores. Since there are a vast number of client resources and possible restrictions that can be applied to those resources, the examples provided above are merely a small set of possible access policies than may be used with embodiments of the invention.

Once an access policy has been selected 430 for an application, as described above, the policy module 320 communicates the access policy to the security module 340. The security module 340 then enforces 440 the access policy on the application, which may involve limiting or denying the application's request for one or more of the client's resources. The security module 340 may enforces 440 the access policy using any of a wide variety of known mechanisms for limiting an application's access to a client's resources. These techniques may include, without limitation, application/resource virtualization, application network firewall, network access control, sandboxing, and behavior blocking policy enforcement point technology. These techniques may provide fine-grained control of the desired application containment, restricting what actions the application is allowed to perform and/or on which resources (or which virtual copy of resources) in the client.

In one embodiment using sandboxing, the sandbox's restrictions may be accomplished using any of a variety of appropriate technologies, and there are many well known technologies that would be suitable. Notably, embodiments of the invention may use the virtualization layering functionality of the Software Virtualization Solution (SVS) application, from Altris, Inc.; the application firewall of the Norton Internet Security (NIS), from Symantec Corporation; SNAC sandboxing (windows station control and resource virtualization); and/or various heuristics, behavior blocking policy enforcement point frameworks, and rule specification engine that are commercially available. These technologies may allow the security system to present copies of critical system resources selectively to an untrusted application (i.e., an application having a low reputation); to selectively allow or deny Internet activity; to grant some types of access (e.g., HTTP), but deny others (e.g., FTP); to allow access to remote and well known sites, but deny or limit access to internal private sites; to allow programs to interact with other programs at their same level of trust, but not higher levels (or other levels); and to achieve various other limitations on an application's ability to access and use a client's resources.

Accordingly, embodiments of the invention allow a security software system to enforce application restrictions according to an application's reputation. But rather than merely black listing to deny known untrustworthy applications from using a client's resources or white listing to approve only known trustworthy applications using those resources, embodiments of the invention enable a graduated scale in which security software can provide multiple levels of access to client resources based on the application's reputation. This avoids many of the weaknesses of pure black or white listing approaches, while maintaining security in a reputation-based system.

In another embodiment, the security software application 110 provides changing levels of access to the client's resources as an application's reputation changes, since in many cases an application's reputation may change over time. Referring again to FIG. 4, after an application's reputation is adjusted 450, the security software application 110 may perform the steps 410 through 440 again to reflect the new reputation score. This may result in a different access policy applied to the application's request for the client's resources, either granting more or less access depending on whether the reputation increased or decreased.

When a new application is released, for example, it may not have a high reputation because there would be few data points about the application. In particular, few users who are considered having good hygiene, or reliability, may have installed and used the application. At the initial stage, therefore, the embodiments of the security software may limit the new application's access to client resources, although not totally blocking it. Beneficially, this provides a level of protection to the user against attacks by a lower reputation new application, while still possibly enabling the user to use either all or part of the application's functionality. As more users install and use the new application and begin to trust it, the application's reputation will tend to increase. This will, in turn, tend to cause embodiments of the security software to enforce less restrictive access policies against the new application. In this way, the security software may adapt to the changing reputations of various applications dynamically and automatically, in an effort to protect a client system without unduly limiting the legitimate software that runs on it.

Although described in terms of enforcement of restrictions on an application, embodiments of the invention are not limited to applying restrictions on applications only. Instead, embodiments of the invention may apply restrictions on any entity that might attempt to access a client's resources. These entities may include, without limitation, websites that a client may access, other computing systems that may communicate with the client via a network, peripheral devices that may be attached to the client, and any other hardware or software entity that may request or otherwise attempt to gain access to a client's resources. The reputation of these entities may be tracked using a reputation server as described above, where a website may be identified by its URL, another computing system by its network name or a serial number address, and a peripheral device by its MAC address or a portion thereof.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for enforcing application restrictions according to an application's reputation, the method comprising:
    observing a request for a resource of a client device from an application executing on the client device;
    selecting an access policy associated with the resource, the access policy describing restrictions related to a set of functions associated with the resource, the restrictions including a restriction that allows a reputable application full access to the set of functions associated with the resource, a restriction preventing a malicious application from accessing the set of functions associated with the resource, and a restriction that allows an unknown application to execute a first plurality of functions from the set of functions of the resource in a sandbox with a virtual copy of the resource and allows the unknown application to execute a second plurality of functions from the set of functions of the resource outside of the sandbox;
    determining a reputation score for the application that is indicative of a measure of trustworthiness of the application;
    determining that the application is an unknown application based on the reputation score of the application;
    determining, from the access policy, the first plurality of functions of the resource allowed to execute in the sandbox with the virtual copy of the requested resource and the second plurality of functions of the resource allowed to execute outside of the sandbox responsive to determining that the application is an unknown application; and
    allowing the application to execute the determined first plurality of functions from the set of functions of the resource in the sandbox with the virtual copy of the requested resource and allowing the unknown application to execute the determined second plurality of functions from the set of functions of the resource outside of the sandbox;
    wherein the method is performed by the client device.

2. The method of claim 1, wherein determining the reputation score for the application comprises retrieving the reputation score from a reputation server via a network.

3. The method of claim 1,
    wherein the access policy is selected by consulting a predefined mapping of reputation scores to access policies.

4. The method of claim 3, wherein the access policy is obtained from a policy server via a network.

5. The method of claim 3, wherein the access policy allows the application access to a subset of the resources on the client device.

6. The method of claim 3, further comprising enforcing the selected access policy using one or more of: application network firewall, network access control, and behavior blocking policy enforcement point technology.

7. The method of claim 1, wherein observing the request for the resource of the client device comprises monitoring for a request from the application for one or more resources of the client device that are suspicious.

8. The method of claim 1, further comprising:
    determining an updated reputation score for the application;
    responsive to the updated reputation score increasing relative to the reputation score, granting the application more access to resources of the client device requested by the application; and
    responsive to the updated reputation score decreasing relative to the reputation score, granting the application less access to resources of the client device requested by the application.

9. The method of claim 8, wherein granting the application more access to resources of the client device comprises:
    allowing partial access to the requested resources outside of the sandbox based on the reputation scores of the requested resources compared to the updated reputation score for the application.

10. The method of claim 1, wherein an unknown application is a newly released application lacking a reputation score indicative that the unknown application is malicious or reputable.

11. The method of claim 1, further comprising:
  determining an updated reputation score for the application;
  responsive to the updated reputation score increasing relative to the reputation score, granting the application more access to the set of functions associated with the resource; and
  responsive to the updated reputation score decreasing relative to the reputation score, granting the application less access to the set of functions associated with the resource.

12. The method of claim 1, further comprising:
  determining a reputation score for the resource that is indicative of a measure of trustworthiness of the resource;
  determining that the reputation score for the resource is less than the reputation score for the application; and
  wherein the unknown allocation is allowed to execute the first plurality of functions from the set of functions of the resource in the sandbox and the application is allowed to execute the second plurality of functions from the set of functions of the resource outside of the sandbox further based on the determination that the reputation score for the resource is less than the reputation score for the application.

13. A computer program product for enforcing application restrictions according to an application's reputation, the computer program product comprising a non-transitory computer-readable storage medium containing executable computer program code, the code when executed by a processor causes the processor to perform steps comprising:
  observing a request for a resource of a client device from an application executing on the client device;
  selecting an access policy associated with the resource, the access policy describing restrictions related to a set of functions associated with the resource, the restrictions including a restriction that allows a reputable application full access to the set of functions associated with the resource, a restriction preventing a malicious application from accessing the set of functions associated with the resource, and a restriction that allows an unknown application to execute a first plurality of functions from the set of functions of the resource in a sandbox with a virtual copy of the resource and allows the unknown application to execute a second plurality of functions from the set of functions of the resource outside of the sandbox;
  determining a reputation score for the application that is indicative of a measure of trustworthiness of the application;
  determining that the application is an unknown application based on the reputation score of the application;
  determining, from the access policy, the first plurality of functions of the resource allowed to execute in the sandbox with the virtual copy of the requested resource and the second plurality of functions of the resource allowed to execute outside of the sandbox responsive to determining that the application is an unknown application; and
  allowing the application to execute the determined first plurality of functions from the set of functions of the resource in the sandbox with the virtual copy of the requested resource and allowing the unknown application to execute the determined second plurality of functions from the set of functions of the resource outside of the sandbox.

14. The computer program product of claim 13, wherein determining the reputation score for the application comprises retrieving the reputation score from a reputation server via a network.

15. The computer program product of claim 13,
  wherein the access policy comprises consulting a predefined mapping of reputation scores to access policies.

16. The computer program product of claim 15, wherein the access policy is obtained from a policy server via a network.

17. The computer program product of claim 15, wherein the access policy allows the application access to a subset of the resources on the client device.

18. The computer program product of claim 15, further comprising enforcing the selected access policy using one or more of: application network firewall, network access control, and behavior blocking policy enforcement point technology.

19. A computer system for enforcing application restrictions according to an entity's reputation, the computer system comprising:
  a computer processor; and
  a non-transitory computer-readable storage medium storing executable instructions configured to execute on the computer processor, upon execution of the executable instructions the computer processor is configured to perform steps comprising:
    observing a request for a resource of a client device from an application executing on the client device;
    selecting an access policy associated with the resource, the access policy describing restrictions related to a set of functions associated with the resource, the restrictions including a restriction that allows a reputable application full access to the set of functions associated with the resource, a restriction preventing a malicious application from accessing the set of functions associated with the resource, and a restriction that allows an unknown application to execute a first plurality of functions from the set of functions of the resource in a sandbox with a virtual copy of the resource and allows the unknown application to execute a second plurality of functions from the set of functions of the resource outside of the sandbox;
    determining a reputation score for the application that is indicative of a measure of trustworthiness of the application;
    determining that the application is an unknown application based on the reputation score of the application;
    determining, from the access policy, the first plurality of functions of the resource allowed to execute in the sandbox with the virtual copy of the requested resource and the second plurality of functions of the resource allowed to execute outside of the sandbox responsive to determining that the application is an unknown application; and
    allowing the application to execute the determined first plurality of functions from the set of functions of the resource in the sandbox with the virtual copy of the requested resource and allowing the unknown application to execute the determined second plurality of functions from the set of functions of the resource outside of the sandbox.

20. The computer system of claim 19, wherein the reputation score is obtained from a reputation server via a network.

21. The computer system of claim 19, wherein determining the reputation score for the application comprising retrieving the reputation score from a reputation server via a network.

22. The computer system of claim 19,
wherein the access policy is selected by consulting a predefined mapping of reputation scores to access policies.

23. The computer system of claim 22, wherein the access policy is obtained from a policy server via a network.

24. The computer system of claim 22, wherein the access policy allows the application access to a subset of the resources on the client device.

25. The computer system of claim 22, further comprising enforcing the selected access policy using one or more of: application network firewall, network access control, and behavior blocking policy enforcement point technology.

* * * * *